US012588979B2

(12) United States Patent
Aydin

(10) Patent No.: US 12,588,979 B2
(45) Date of Patent: Mar. 31, 2026

(54) ACTIVE SELF-LIGATING ORTHODONTIC BRACKET

(71) Applicant: Resai Aydin, Istanbul (TR)

(72) Inventor: Resai Aydin, Istanbul (TR)

( * ) Notice: Subject to any disclaimer, the term of this patent is extended or adjusted under 35 U.S.C. 154(b) by 810 days.

(21) Appl. No.: 17/798,579

(22) PCT Filed: Feb. 20, 2020

(86) PCT No.: PCT/TR2020/050126
§ 371 (c)(1),
(2) Date: Aug. 10, 2022

(87) PCT Pub. No.: WO2021/167546
PCT Pub. Date: Aug. 26, 2021

(65) Prior Publication Data
US 2023/0108869 A1     Apr. 6, 2023

(51) Int. Cl.
*A61C 7/28* (2006.01)
*A61C 7/30* (2006.01)

(52) U.S. Cl.
CPC ................ *A61C 7/287* (2013.01); *A61C 7/30* (2013.01)

(58) Field of Classification Search
CPC .. A61C 7/287; A61C 7/12; A61C 7/14; A61C 7/28; A61C 7/30
See application file for complete search history.

(56) References Cited

U.S. PATENT DOCUMENTS

| | | | |
|---|---|---|---|
| 5,474,446 A | 12/1995 | Wildman et al. | |
| 9,089,386 B2 * | 7/2015 | Hagelganz | A61C 7/287 |
| 10,080,628 B2 * | 9/2018 | Sommer | A61C 7/287 |
| 2014/0141383 A1 | 5/2014 | Hagelganz et al. | |
| 2014/0272753 A1 | 9/2014 | Sommer et al. | |

* cited by examiner

*Primary Examiner* — Edward Moran
(74) *Attorney, Agent, or Firm* — Bayramoglu Law Offices LLC

(57) ABSTRACT
The bracket for orthodontic treatment includes a body; a slot which extends in the vertical plane from the ceiling of the body towards the base thereof and which receives a wire; a lid which moves forwards/backwards so as to open/close the mouth of the slot; a spring and lock group having at least one spring which is provided between the body and the lid, which stretches in the vertical plane and which moves together with the lid with one end being fixed to the lid and the other being free; and a movement mechanism which has at least one rail extending on the ceiling of the body perpendicularly to the slot and at least one slide fitted into said rail and extending downwards from the lower surface of the lid and which enables the lid to move by sliding on the ceiling of the body.

16 Claims, 9 Drawing Sheets

ACTIVE SELF-LIGATING ORTHODONTIC BRACKET

CROSS REFERENCE TO THE RELATED APPLICATIONS

This application is the national stage entry of International Application No. PCT/TR2020/050126, filed on Feb. 20, 2020, the entire contents of which are incorporated herein by reference.

TECHNICAL FIELD

The present invention relates to a bracket which is used in orthodontic treatment, which allows the wires with various cross-sections to be attached to the teeth, which has a self-ligating system without requiring a ligature, which is applied on the teeth by being adhered onto the teeth and through which wires pass.

BACKGROUND

Wires with various cross-sections, which are used for the correction of the alignment of the teeth in orthodontic treatment, are preferably attached to the teeth by means of the brackets fixed to the teeth by adhesion. At the beginning of orthodontic treatment, wires with circular cross-sections which are more flexible and exert less force onto the teeth are preferably used. At the following stages, wires with polygonal, preferably rectangular, cross-sections which exert more force onto the teeth are used. Depending on the method of attaching the wires, self-ligating brackets are divided in two classes: active and passive. In the passive method, the wires are attached inside the bracket and no force is exerted thereon. In this method, the wire cannot be controlled as no force is exerted thereon. While at the beginning of the treatment the wire is desired to move freely and hence to exert less force onto the tooth, the wire is desired to be kept under control at the later stages of the treatment where thicker wires are used. Since in the passive method no force is exerted on the thick and angular wire, the angles determined on the bracket in the production stage in order to guide the tooth cannot be completely transferred to the tooth. In the active method developed to solve this problem, a force is exerted onto the wire after reaching a predetermined width. In this type of brackets the most important component is the spring which is provided on the bracket and which exerts force onto the wire. A large number of problems may occur in the spring and the lid mechanism provided on the bracket. The ability of the bracket to function efficiently in the mouth is very important for both the physician and the patient.

In the state of the art, brackets comprising a lid with a spring thereon are developed. Thus, the spring exerts pressure onto the wire from above and tries to fit the wire into the slot. However, in this type of bracket, there may be some problems such as the insufficiency of the force exerted by the spring, deformation of the spring, accumulation of food residues on the spring, the movement of the spring being prevented by tartar, etc.

In the state of the art United States Patent Application No. US2014141383, the lid tries to push and move the leaves while the lid is opened and closed as the flexible spring leaves are provided in the lid in a movable manner. When the archwire completely covers the slot or stops rotating and the lid pushes the leaves, the leaves would come into contact with the wire and get stuck since there would be no area for stretching. This may result in the deformation of the leaves. Moreover, it is disclosed that upon coming into contact with the wire the springs stretch and move onto the wire so as to exert pressure onto the wire. However, the springs described become deformed due to lack of fixed center of rotation, center of resistance and effort arm.

Another state of the art document is the United States Patent Application No. US2014272753. In this document, since in the spring mechanism provided in the ligating system allowing the opening/closing of the bracket there is no stretching area for the spring while the lid is opened/closed, the end of the spring is squeezed and flattened between the lid and the body in the open position. This situation, which is constantly repeated during the opening and closing of the lid, would cause deformation in the spring. When the lid is closed and the archwire is active, the end of the spring is also deformed since the end of the spring is not compatible with the lid. Since the tie wings in the ligating mechanism are part of the lid, other components (wire, ligature etc.) attached or connected to the tie wings must be removed.

SUMMARY

The aim of the present invention is the realization of a bracket which is used in orthodontic treatment and which enables wires with various cross-sections to be attached to the teeth.

The bracket realized in order to attain the aim of the present invention, explicated in the first claim and the respective claims thereof, comprises a body; a slot which lingually extends in the vertical plane from the ceiling of the body towards the base thereof and which receives a wire; a lid which moves forwards/backwards in the occlusal-gingival direction so as to open/close the mouth of the slot; a spring and lock group having at least one spring which is provided between the body and the lid, which stretches in the vertical plane and which moves together with the lid with one end being fixed to the lid and the other being free; and a movement mechanism which has at least one rail extending on the ceiling of the body perpendicularly to the slot and at least one slide fitted into said rail and extending downwards from the lower surface of the lid and which enables the lid to move by sliding on the ceiling of the body and at least one recess which enables the spring and the lid to be flush with each other when the spring is completely fitted.

The form of the springs fixed to the lid is fully compatible with the lid. When the free end of the spring is completely fitted into the recess, the lid and the spring become flush with each other, and hence the spring does not form a protrusion between the lid and the body over which the spring slides.

The movement mechanism comprises two parallel rails which extend on the ceiling of the body perpendicularly to the slot and two slides which are fitted into both rails and which vertically extend downwards from the lower surface of the lid. By being fitted into the rails, the slides enable the lid to move by sliding forwards/backwards on the body. The depth of the rails is preferably less than the depth of the slot.

The rail is a groove between two walls with one wall being flat and the wall opposite to the flat wall being inclined upwards. The slide has walls in a form compatible with said groove form of the rail. In the embodiment of the present invention, the slide and the rail are trapezoidal. By means of the inclined walls, after the slide is fitted into the rail, the slide is prevented from being dislodged from the rail by being pulled in the vertical direction. By means of this embodiment, the lid can be detachably attached onto the body just by a sliding motion. By means of the movement mechanism, stability is provided during the opening/closing movement. The lid moves over the body just like a bolt.

In the embodiment of the present invention, the bracket comprises a spring and lock group having two parallel springs and two locking claws extending between the two springs in the same plane as the springs. The spring and lock group is produced by forming a plate and the springs are provided on the two arms of the U-shaped plate while the locking claws are positioned between the springs. The locking claws face opposite directions and the upper sides of the locking claws are curvilinear. By means of this form, the spring and lock group slidably moves over the body together with the lid. Stoppers are provided at the lower side of each locking claw.

In another embodiment of the present invention, the bracket comprises a step on the guide having an inclined surface which is provided at the side of the guide facing the rails and a flat surface extending from the end point of the inclined surface.

In the preferred embodiment of the present invention, the bracket comprises at least one bearing which is formed on the base of the lid so as to align with the springs on the lid. In this embodiment of the present invention, the bracket comprises two springs and two bearings. By positioning the spring and lock group between the bearing and the inclined surface which is provided on the step on the guide, the lid is prevented from being dislodged from the bracket.

The bracket of the present invention is preferably a mandibular incisor bracket, and the lid moves in the occlusal direction while being closed.

By means of the present invention, a bracket is realized, which is hygienic and easy-to-use, which provides rapid tooth movement and which is prevented from getting deformed, wherein the force exerted on the wire fitted into the slot can be controlled during the movement of the lid on the body.

BRIEF DESCRIPTION OF THE DRAWINGS

A bracket realized in order to attain the aim of the present invention is illustrated in the attached figures, where.

The elements illustrated in the figures are numbered as follows.

Figure 1:
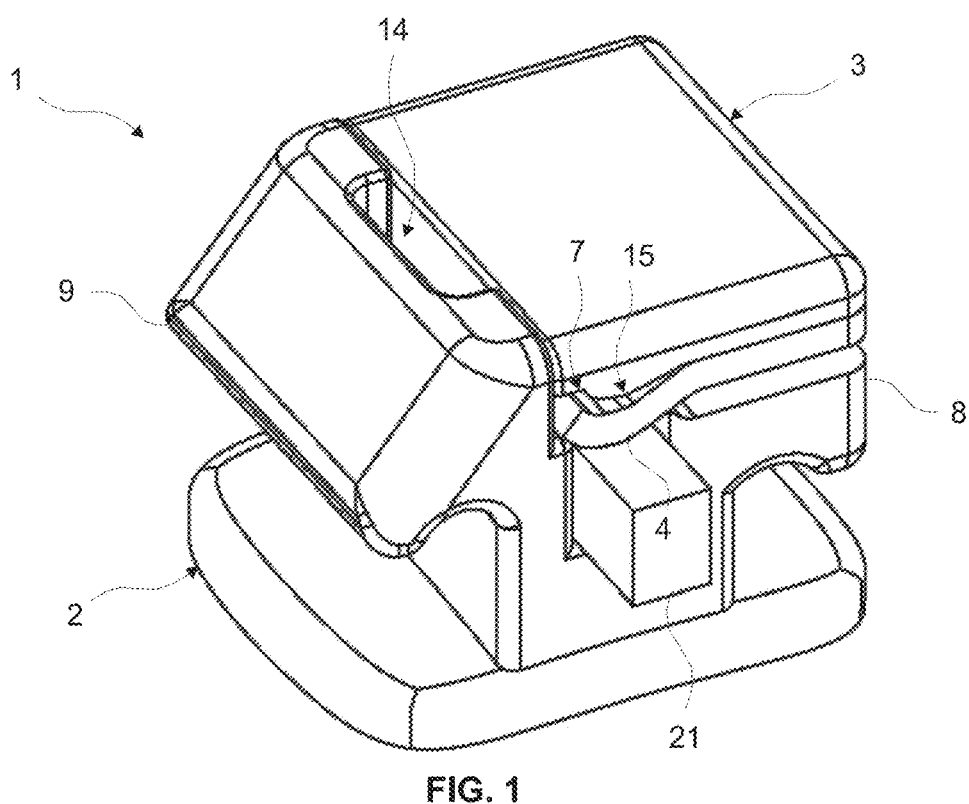
FIG. 1 is the perspective view of a bracket when the lid is closed.

1. Bracket
2. Body
3. Lid
4. Spring
5. Slot
6. Housing
7. Recess
8. First section
9. Second section
10. Movement mechanism
11. Rail
12. Slide
13. Receptacle
14. Additional receptacle
15. Bearing
16. Step
17. Locking claw
18. Locking slot
19. Spring and lock group
20. Stopper
21. Wire
22. Platform
23. Guide
24. Locking recess
25. Protrusion
26. Inclined surface
27. Flat surface

DETAILED DESCRIPTION OF THE EMBODIMENTS

Figure 5:
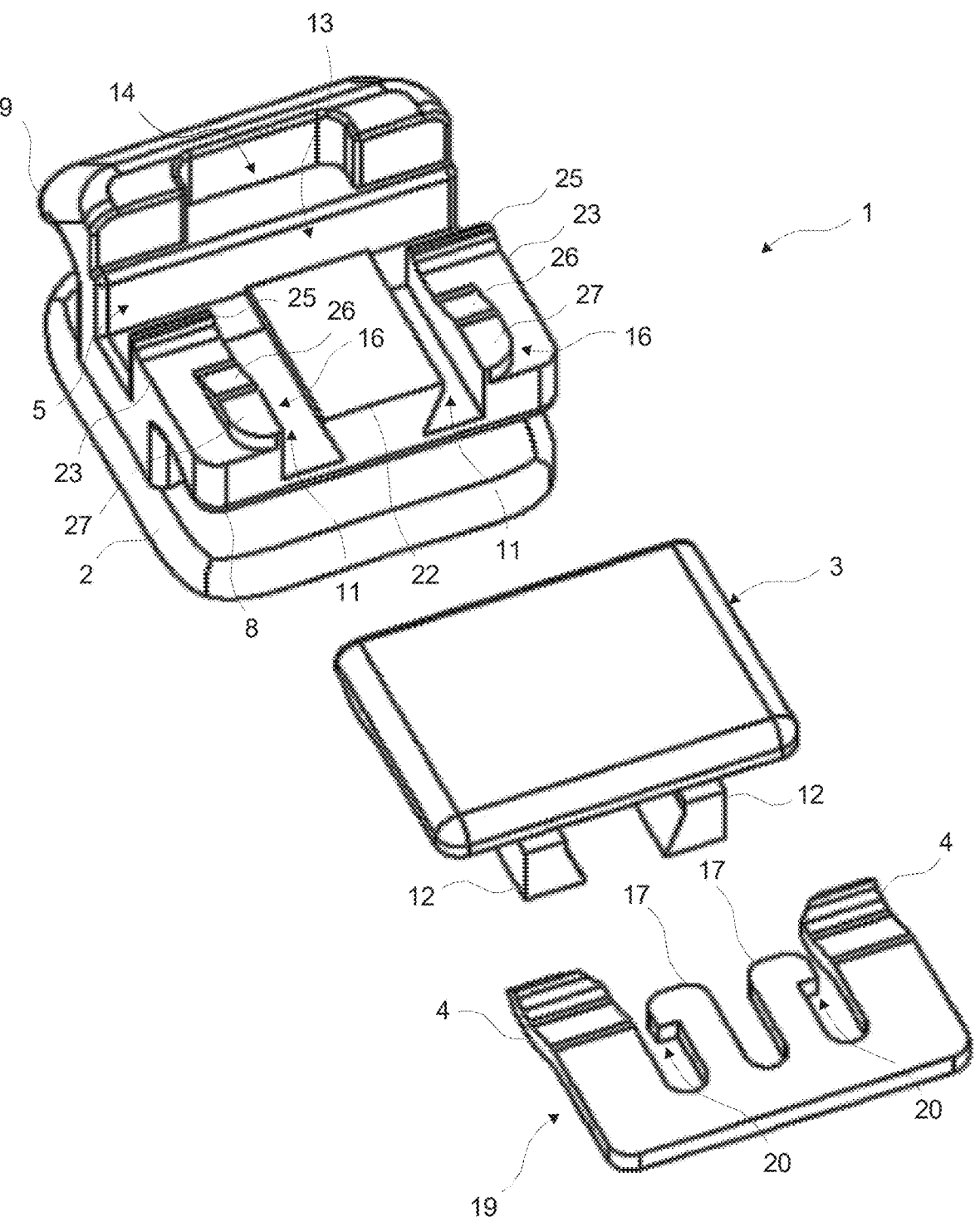
FIG. 5 is the top exploded perspective view of the bracket.

The bracket (1) of the present invention is suitable to be used in orthodontic treatment, comprising a body (2); a slot (5) which extends in the vertical plane from the ceiling of the body (2) towards the base thereof and which receives a wire (21); a lid (3) which moves forwards/backwards so as to open/close the mouth of the slot (5); a spring and lock group (19) having at least one spring (4) which is provided between the body (2) and the lid (3), which stretches in the vertical plane and which moves together with the lid (3) with one end being fixed to the lid (3) and the other being free; and a movement mechanism (10) which has at least one rail (11) extending on the ceiling of the body (2) perpendicularly to the slot (5) and at least one slide (12) fitted into said rail (11) and extending downwards from the lower surface of the lid (3) and which enables the lid (3) to move by sliding on the ceiling of the body (2) and at least one recess (7) which enables the spring (4) and the lid (3) to be flush with each other when the spring (4) is completely fitted (FIG. 1 and FIG. 5).

By means of the recess (7), as the free end of the spring (4) moves towards the recess (7) in case the lid (3) makes a sliding motion over the body (2) or the wire (21) in the slot (5) exerts force onto the spring (4), the free end of the spring (4) becomes flush with the lid (3) so as not to form a protrusion on the lid (3) and the spring (4) is prevented from being deformed by the spring (4) being squeezed between the body (2) and the lid (3). When the free end of the spring (4) is completely fitted into the recess (7), the lid (3) and the spring (4) become flush with each other, and hence the spring (4) does not form a protrusion between the lid (3) and the body (2) over which the spring (4) slides.

In the preferred embodiment of the present invention, the movement mechanism (10) comprises two parallel rails (11) which extend on the ceiling of the body (2) perpendicularly to the slot (5) and two slides (12) which are fitted into both rails (11) and which vertically extend downwards from the lower surface of the lid (3). By being fitted into the rails (11), the slides (12) enable the lid (3) to move by sliding forwards/backwards on the body (2). The depth of the rails (11) is preferably less than the depth of the slot (5).

Figure 6:
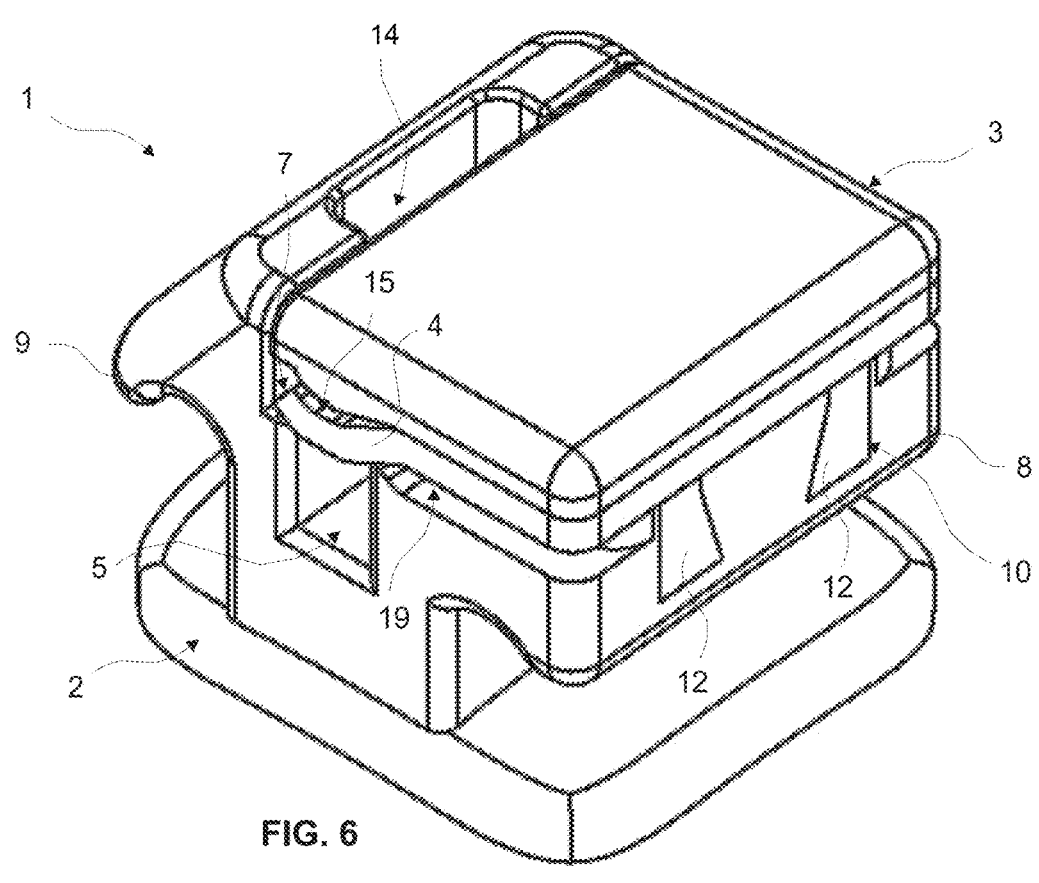
FIG. 6 is the rear perspective view of the bracket when the lid is closed.
Figure 7:
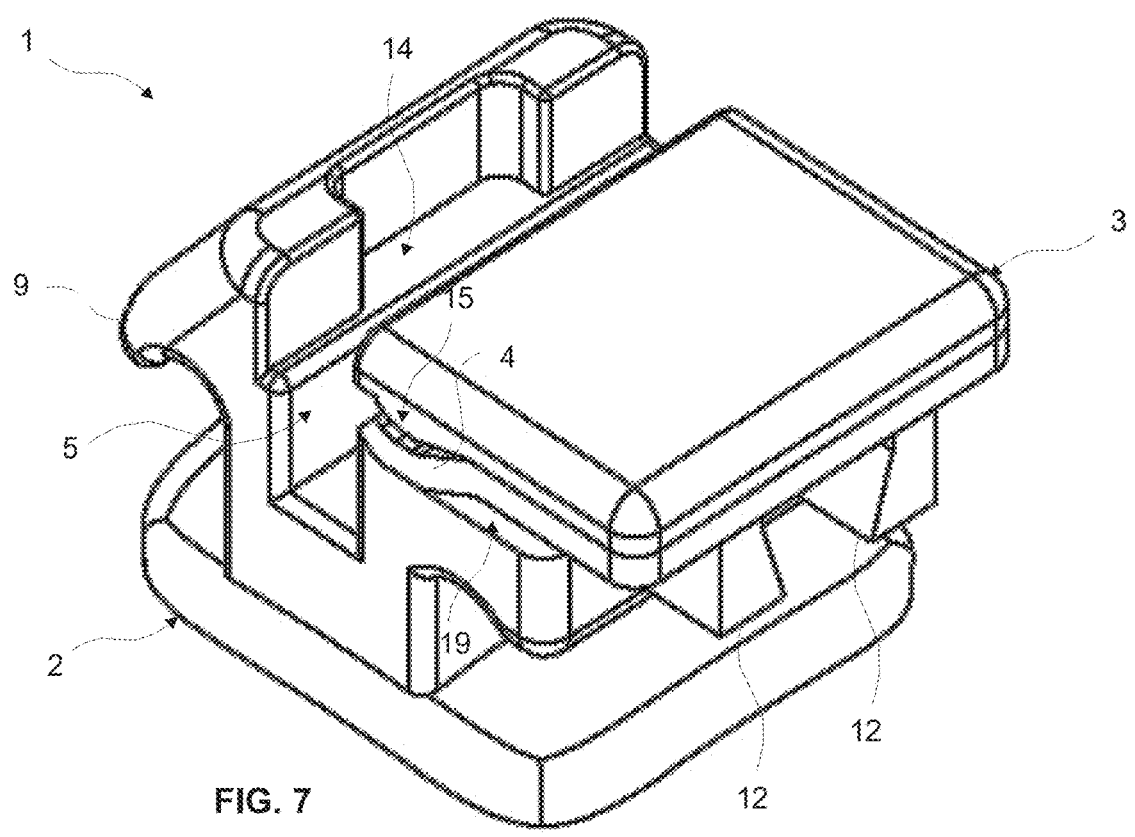
FIG. 7 is the rear perspective view of the bracket when the lid is open.
Figure 8:
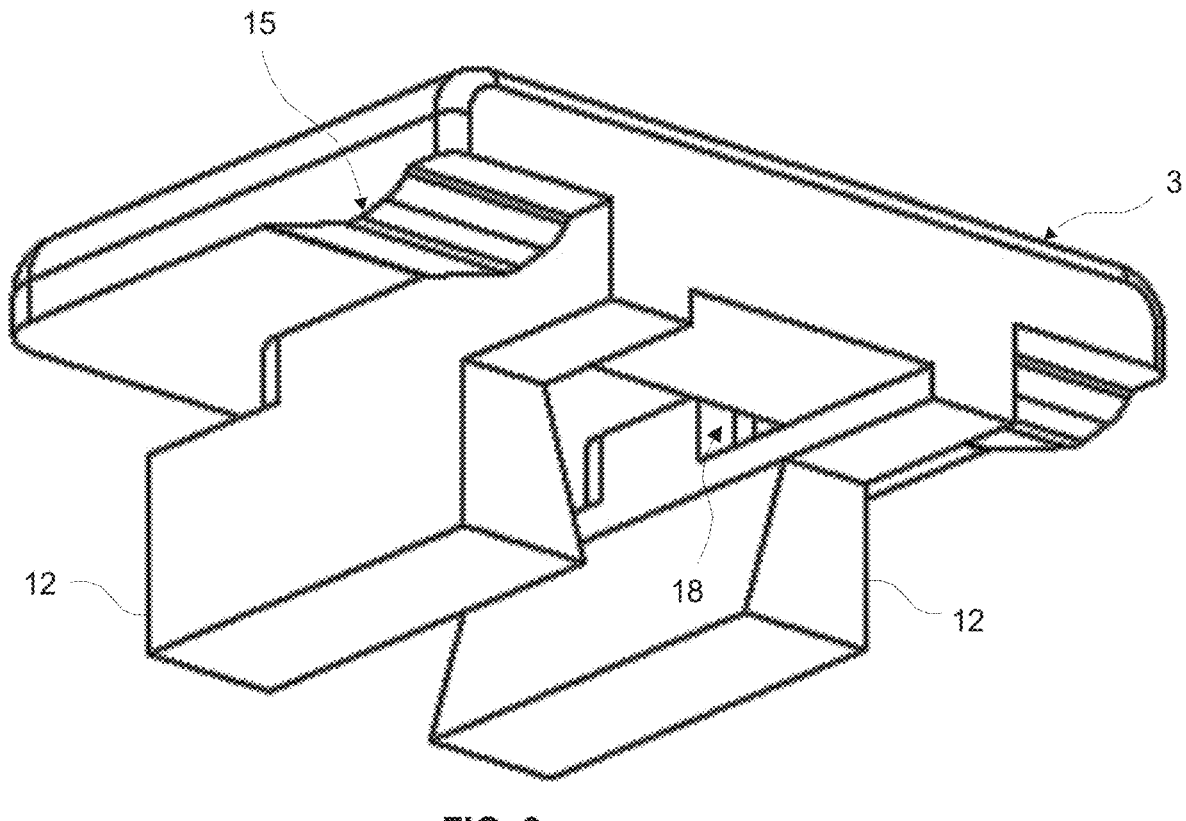
FIG. 8 is the bottom perspective view of the bracket.
Figure 9:
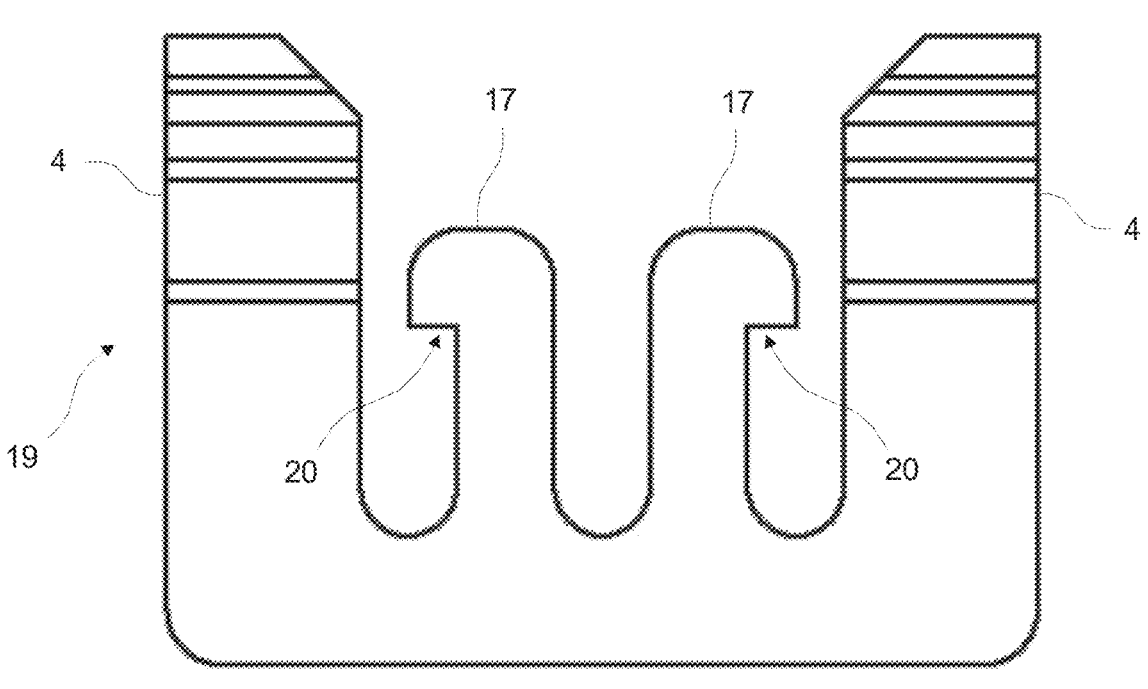
FIG. 9 is the sideways view of the bracket when the lid is open.

In the embodiment of the present invention, the rail (11) is a groove between two walls with one wall being flat and the wall opposite to the flat wall being inclined upwards. The slide (12) has walls in a form compatible with said groove form of the rail (11). In the embodiment of the present invention, the slide (12) and the rail (11) are trapezoidal. By means of the inclined walls, after the slide (12) is fitted into the rail (11), the slide (12) is prevented from being dislodged from the rail (11) by being pulled in the vertical direction. By means of this embodiment, the lid (3) can be detachably attached onto the body (2) just by a sliding motion. By means of the movement mechanism (10), stability is provided during the opening/closing movement. The lid (3) moves over the body (2) just like a bolt (FIG. 6 and FIG. 7).

In the embodiment of the present invention, the bracket (1) comprises a spring and lock group (19) having two parallel springs (4) and two locking claws (17) extending between the two springs (4) in the same plane as the springs (4). The spring and lock group (19) is produced by forming a plate and the springs (4) are provided on the two arms of the U-shaped plate while the locking claws (17) are positioned between the springs (4). The locking claws (17) face opposite directions and the upper sides of the locking claws (17) are curvilinear. By means of this form, the spring and lock group (19) slidably moves over the body (2) together with the lid (3). Stoppers (20) are provided at the lower side of each locking claw (17) (FIGS. 8-12). In another embodiment of the present invention, the spring and lock group (19) can be easily produced by means of three-dimensional printers.

In the embodiment of the present invention, the bracket (1) comprises a flat platform (22) which is positioned between the rails (11) on the body (2) and two guides (23) which are positioned beside the rails (11) and the bracket (1) and which are aligned with the springs (4).

In the embodiment of the present invention, the bracket (1) comprises two housings (6) which are provided on the two guides (23) close to the labial side and wherein the springs (4) are fitted. Thus, since the lid (3) and the spring (4) are close to the labial side, that is the upper surface, not to the base area where the tartar and plaque accumulation is the highest, the movement of the spring (4) and of the lid (3) is not blocked due to factors such as tartar or plaque accumulation which may occur in the course of time. In this embodiment, the bracket (1) comprises a protrusion (25) on each guide (23) at the side of the housing (6) facing the slot (5). While the lid (3) is shifted to the open or closed position by means of an external force, the protrusions (25) exert pressure onto the springs (4) from below and push the springs (4) towards the recess (7), thus enabling the lid (3) to slide over the body (2), and if there is no force exerted, the protrusions (25) enable the lid (3) to be kept stable on the body (2).

In an embodiment of the present invention, the slot (5) divides the body (2) into two as the first and second sections (8 and 9). In this embodiment of the present invention, the bracket (1) comprises a receptacle (13) which is provided on the first section (8) on the body (2) and whereon the lid (3) is attached. By means of the receptacle (13), the lid (3) does not form any protrusions on the body (2) when in the closed position. In this case, the lid (3) and the body (2) are flush with each other. The lid (3) moves by sliding forwards/backwards in the receptacle (13). Moreover, in this embodiment, the bracket (1) comprises an additional receptacle (14) which is provided on the second section (9), against which the lid (3) bears such that the movement of the lid (3) ends while shifting to the closed position and wherein the lid (3) is fitted as the movement is completed. Thus, the additional receptacle (14) serves as a stopper and enables the lid (3) to be kept stable on the body (2) when in the closed position.

Figure 10:
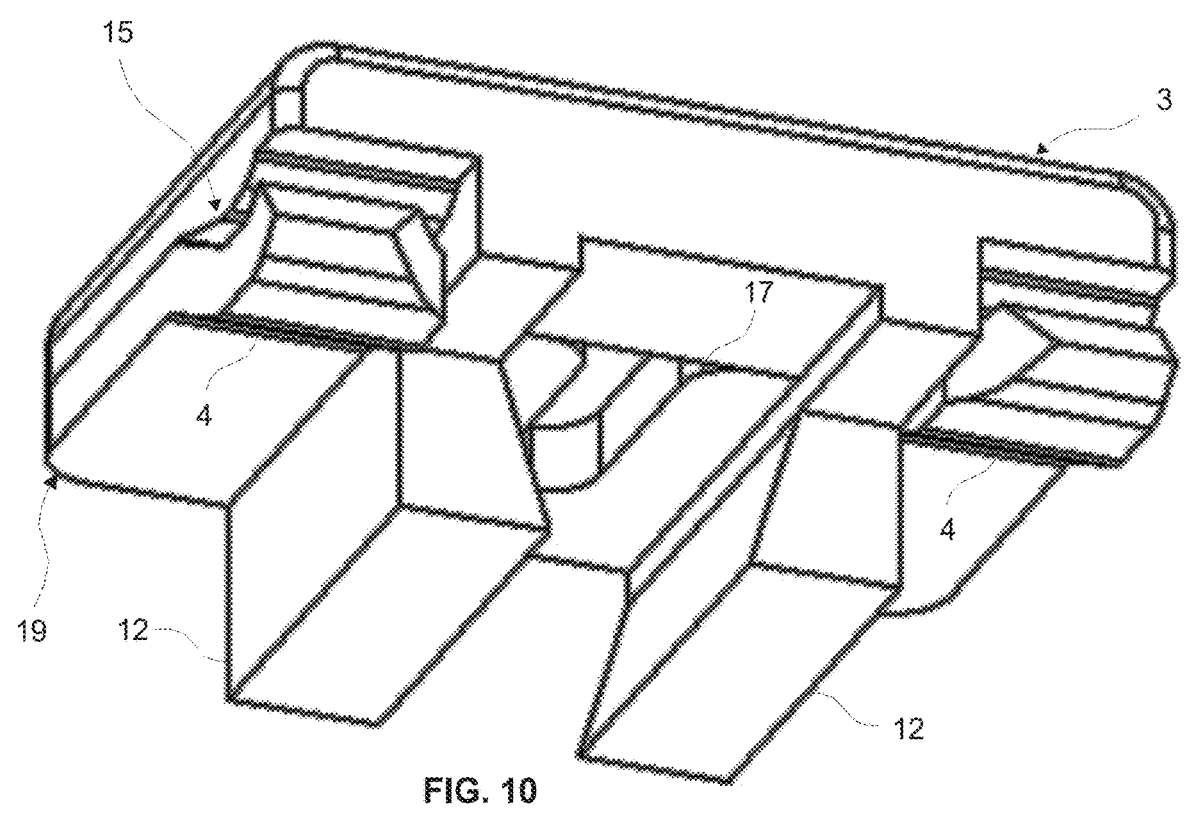
FIG. 10 is the bottom front perspective view of the lid and the spring and lock group together.
Figure 11:
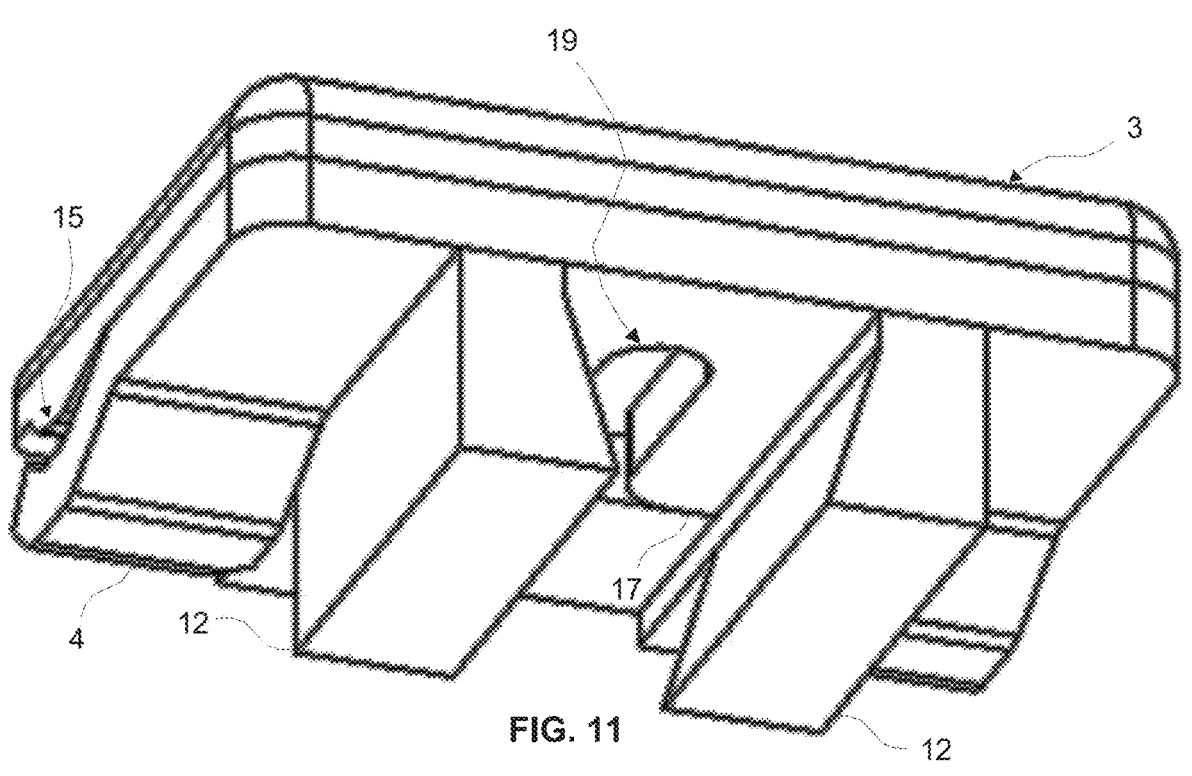
FIG. 11 is the bottom rear perspective view of the lid and the spring and lock group together.
Figure 12:
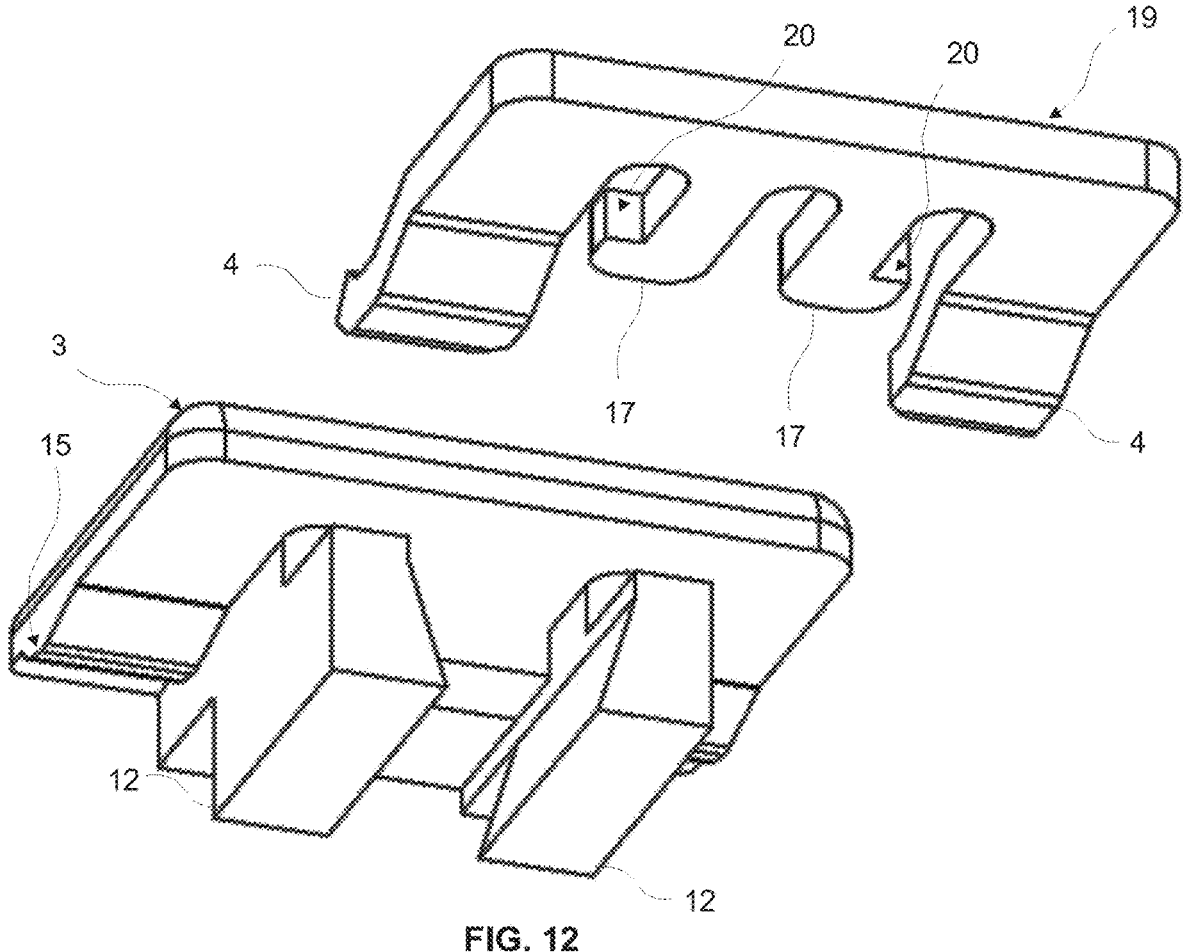
FIG. 12 is the bottom exploded perspective view of the lid and the spring and lock group together.
Figure 14:
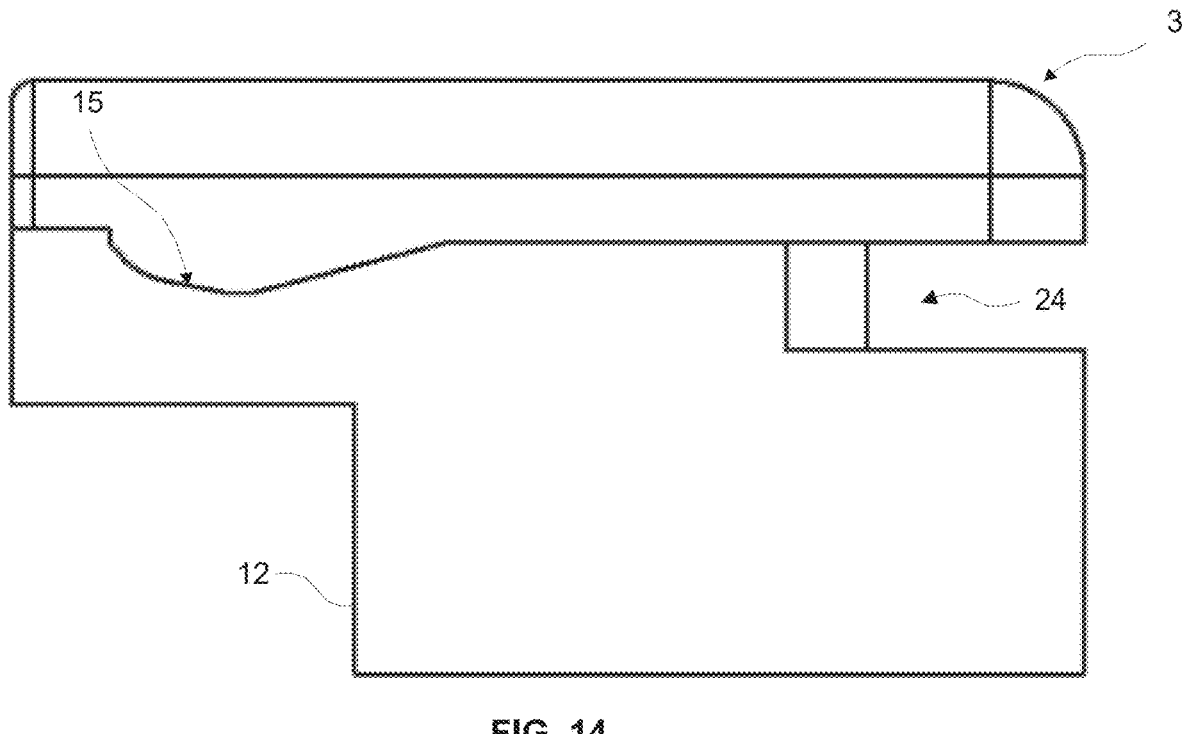
FIG. 14 is the sideways view of the lid.

In an embodiment of the present invention, the spring (4) is a leaf spring which is formed by bending the ends of a flexible strip-shaped material upwards (FIG. 10 and FIG. 11). The spring (4) serves as a spring and is preferably produced from metal. Moreover, the spring (4) can be produced with three-dimensional printers. In this embodiment of the present invention, the housing (6) has a form compatible with that of the spring (4). In this embodiment of the present invention, by positioning the spring (4) and the locking claws (17) on a single plate-shaped piece, a fulcrum is formed, enabling the free end of the spring (4) to move smoothly and to compensate loads acting thereon (FIG. 12). In this embodiment, the spring (4) is in contact with the guide (23) and is horizontally positioned in case no force is exerted thereon. Therefore, when the wire (21) exerts a force, the spring (4) moves upwards from the horizontal position at a certain angle (FIG. 14).

Figure 13:
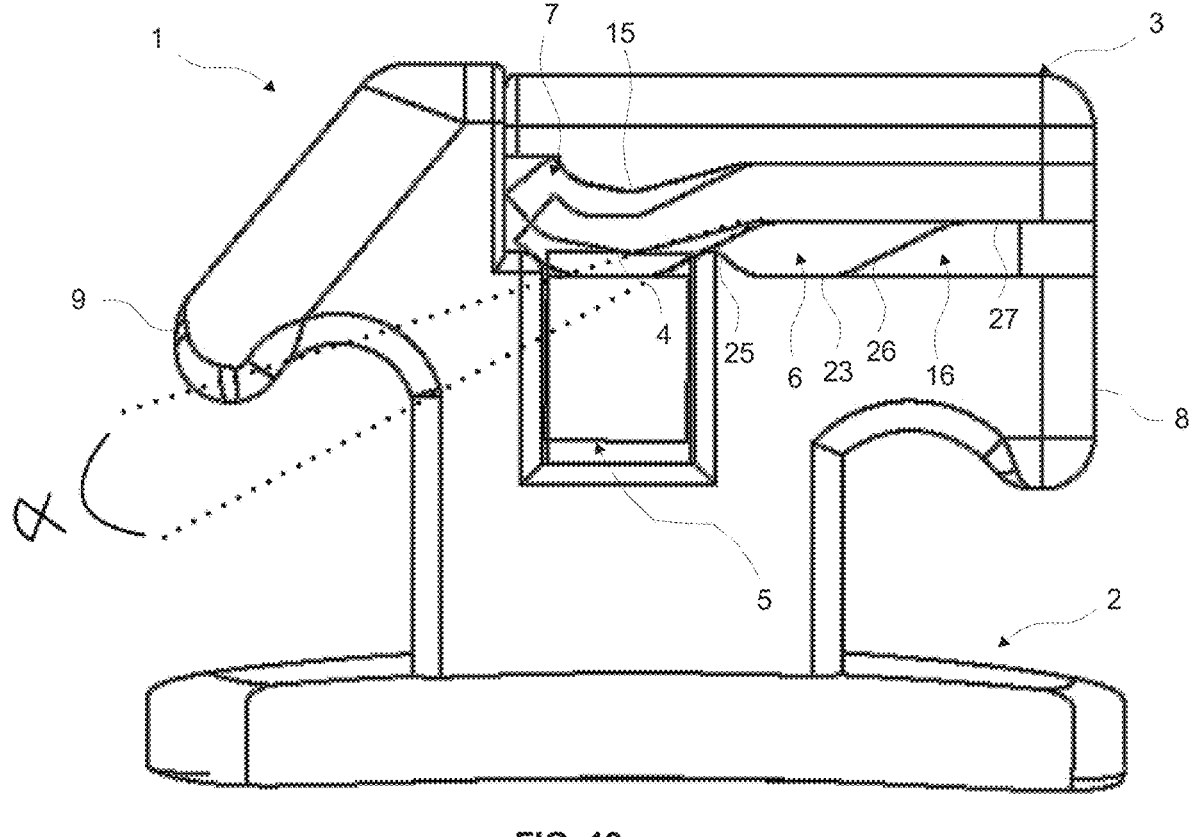
FIG. 13 is the sideways view of the bracket when closed.

In the preferred embodiment of the present invention, the bracket (1) comprises two locking slots (18) which are provided on the surface of the lid (3) facing the receptacle (13). The locking claws (17) are fitted into said locking slots (18), thus enabling the spring and lock group (19) to be locked onto the lid (3) and the body (2). The locking claws (17) also prevent the spring and lock group (19) from being detached from the lid (3) and enable the same to move together with the lid (3) while the lid (3) shifts to the closed position. The bracket (1) of the present invention comprises at least one locking recess (24) which is provided at the rear side of the body (2) and the lid (3) so as to provide a gap or space on the lid (3) and the body (2) and which enables the spring and lock group (19) to be attached onto the lid (3). By being firmly fitted into the locking slot (18) and the locking recess (24), the spring and lock group (19) is kept stable on the lid (3) (FIG. 13).

In another embodiment of the present invention, the bracket (1) comprises a step (16) on the guide (23) having an inclined surface (26) which is provided at the side of the guide (23) facing the rails (11) and a flat surface (27) extending from the end point of the inclined surface (26).

In the preferred embodiment of the present invention, the bracket (1) comprises at least one bearing (15) which is formed on the base of the lid (3) so as to align with the springs (4) on the lid (3). In this embodiment of the present invention, the bracket (1) comprises two springs (4) and two bearings (15). By positioning the spring and lock group (19) between the bearing (15) and the inclined surface (26) which is provided on the step (16) on the guide (23), the lid (3) is prevented from being dislodged from the bracket (1).

In the preferred embodiment, the lid (3) is produced from steel. However, the lid (3) and the bracket (1) can be produced from, in addition to steel, alumina, composite and similar materials.

In an embodiment of the present invention, the bracket (1) comprises a safety mechanism which prevents the lid (3) from being detached from the body (2) while shifting from the closed position to the open position by means of the springs (4), which form the side arms in the spring and lock group (19), being positioned between the step (16) on the guide (23) and the bearing (15) at the lower side of the lid (3).

In another embodiment of the present invention, the bracket (1) comprises a locking mechanism which locks the components of the spring and lock group (19) to each other, thus preventing the same from detaching from each other and enabling the same to move in a stable manner during the opening/closing of the lid (3) as the locking claws (17) on the spring and lock group (19) and the bar over which the locking claws (17) extend are fitted into the locking slots (18) and the locking recess (24).

In another embodiment of the present invention, the bracket (1) comprises an activation mechanism which enables the spring (4) to be fitted into the locking recess (24) at the lower side of the lid (3) and the bearing (15) without getting deformed so as to be activated in case the protrusion on the guide (23) or the wire (21) exerts pressure onto the spring (4) as the lid (3) moves between the closed and open positions.

In the bracket (1) of the present invention, the spring and lock group (19) is mounted onto the lid (3) and the lid (3) with the spring and lock group (19) thereon is mounted onto the body (2).

Figure 2:
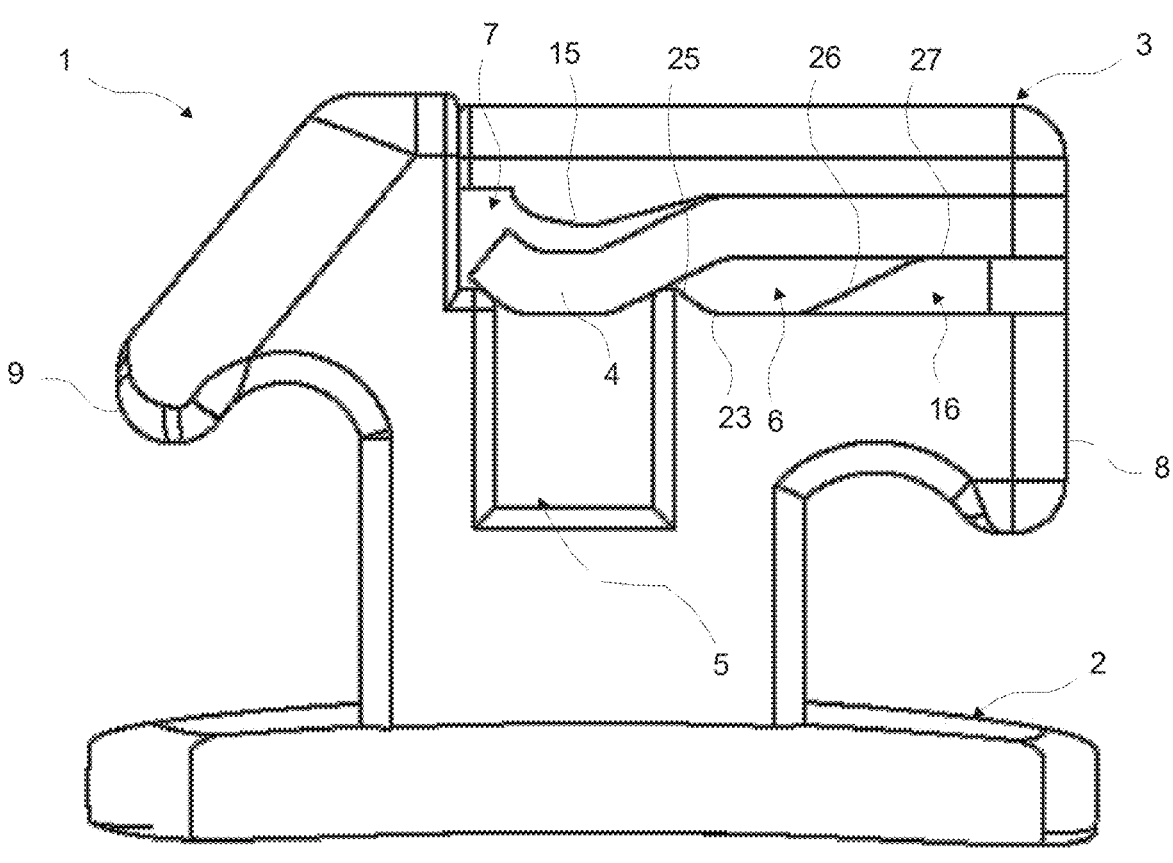
FIG. 2 is the sideways view of the bracket when the lid is closed.
Figure 3:
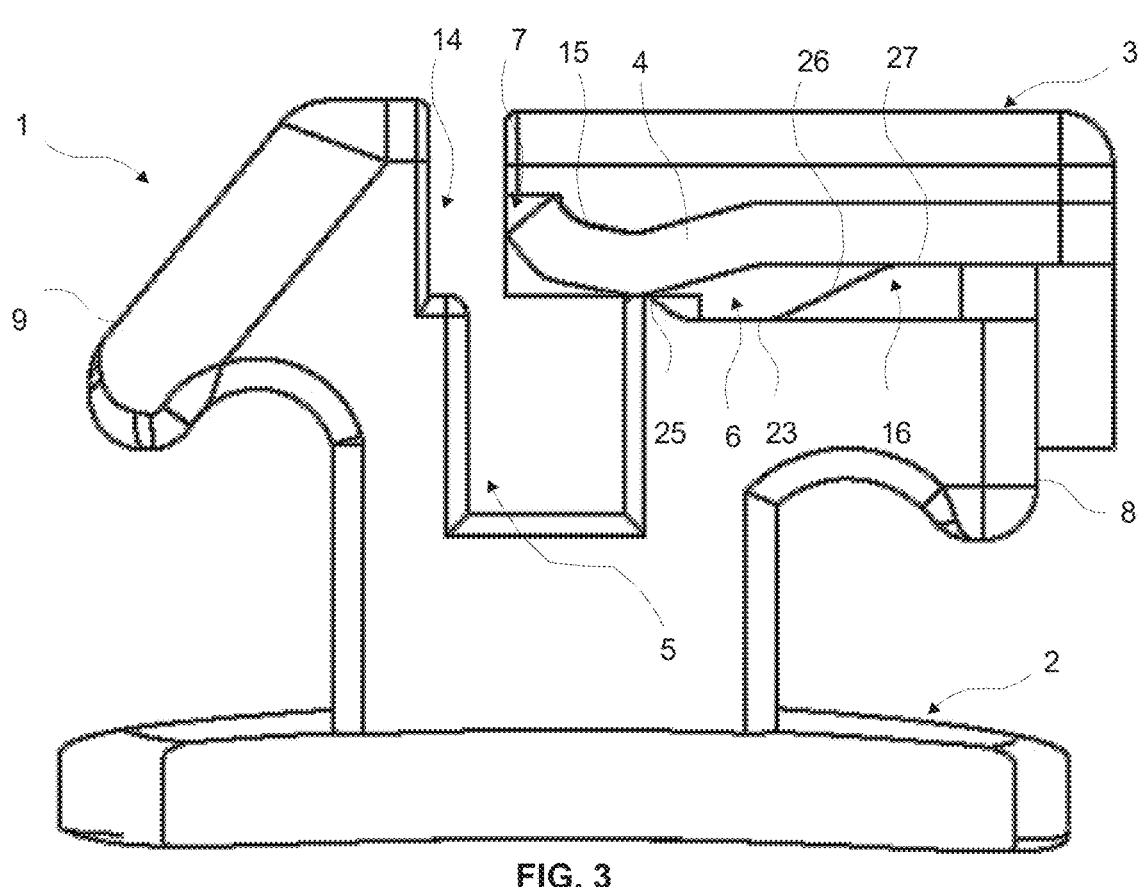
FIG. 3 is the sideways view of the bracket when the lid is being opened.
Figure 4:
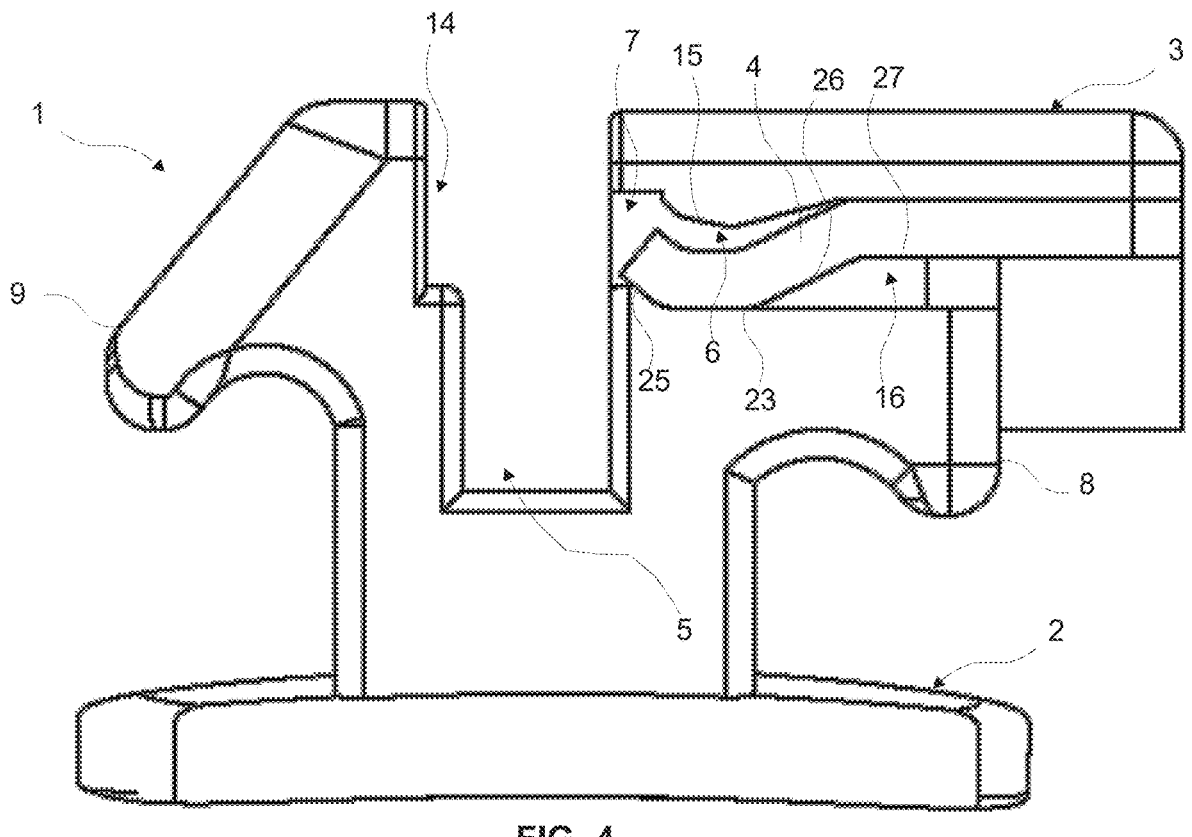
FIG. 4 is the sideways view of the bracket when the lid is open.

The bracket (1) of the present invention is operated as follows: When the lid (3) is in the closed position, the lid (3) is seated onto the additional receptacle (14) in the second section (9) and the receptacle (13) in the first section (8) so as to fully cover the slot (5). In this case, the body (2) and the lid (3) are flush with each other and the lid (3) does not form any protrusions on the bracket (1). Moreover, when the lid (3) is closed, the locking claws (17) are fitted into the locking slots (18). When the lid (3) is closed, the free end of the spring (4) is positioned between the slot (5) and the recess (7). In case the wire (21) exerts pressure onto the spring (4) depending on the width of the wire (21) in the slot (5), the spring (4) moves towards the recess (7). When the lid (3) is tried to be shifted to the open position with an external force, the lid (3) starts to slide over the body (2), hence over the receptacle (13) by means of the rail (11) and the slide (12) provided in the movement mechanism (10). During this movement, the edge of the lid (3) leaves the additional receptacle (14) wherein the same is seated in the closed position. Moreover, the free end of the spring (4) leaves the slot (5) and moves towards the receptacle (13) together with the lid (3). When the lid (3) is fully open, the free end of the spring (4) is completely fitted into the housing (6) (FIGS. 2-4).

In this embodiment, since by means of the recess (7), in particular the springs (4) do not form any protrusion on the contact surfaces between the lid (3) and the body (2) during the movement of the lid (3), the springs (4) are prevented from getting deformed due to this effect. Moreover, thanks to the compatible forms of the spring (4), the housing (6) and the recess (7), even the free end of the spring (4) is not deformed. Furthermore, the springs (4) are fixed into the housings (6) provided-closer to the occlusal side-on the side walls of the lid (3).

By means of the present invention, a bracket (1) is realized, which is hygienic and easy-to-use, which provides rapid tooth movement and which is prevented from getting deformed due to external factors, wherein the force exerted on the wire (21) fitted into the slot (5) enables the wire (21) to be controlled during the movement of the lid (3) on the body (2).

What is claimed is:

1. A bracket for orthodontic treatment, comprising
a body;
a slot, wherein the slot extends in a vertical plane from a ceiling of the body towards a base of the body and the slot receives a wire;
a lid, wherein the lid moves forwards/backwards to open or close a mouth of the slot, and the lid comprises at least one bearing protruding downward toward the slot;
a spring and lock group having at least one spring, wherein the spring and lock group is provided between the body and the lid, the spring and lock group extends in the vertical plane and moves together with the lid, and the spring and lock group has a first end being fixed to the lid and a second end being free;
a movement mechanism, wherein the movement mechanism has at least one rail extending on the ceiling of the body perpendicularly to the slot and at least one slide fitted into the rail and extending downwards from a lower surface of the lid, and the movement mechanism enables the lid to move by sliding on the ceiling of the body; and
at least one recess provided in between the at least one spring and the lid, wherein the at least one recess enables the at least one spring and the at least one bearing to be flush with each other when the at least one spring is pushed upward;
wherein the movement mechanism comprises two parallel rails and two slides;
wherein the two parallel rails extend on the ceiling of the body perpendicularly to the slot and the two slides are fitted into the two parallel rails and vertically extend downwards from the lower surface of the lid; and
wherein each of the two parallel rails is a groove between a first wall being flat and a second wall opposite to the first wall, the second wall is inclined upwards, and each of the two slides has walls compatible with the grooves of the two parallel rails.

2. The bracket according to claim 1, wherein the two slides and the two parallel rails are trapezoidal.

3. The bracket according to claim 1, wherein the spring and lock group comprises two parallel springs and two locking claws, wherein the two locking claws extend between the two parallel springs in the same plane as the two parallel springs.

4. The bracket according to claim 3, wherein the spring and lock group is produced by forming a U-shaped plate, the two parallel springs are provided on two arms of the U-shaped plate and the two locking claws are positioned between the springs.

5. The bracket according to claim 4, wherein the two locking claws have curvilinear upper edges and stoppers at a lower edge.

6. The bracket according to claim 1, further comprising
a flat platform, wherein the flat platform is positioned between the two parallel rails on the body, and
two guides, wherein the two guides are positioned beside the two parallel rails on the bracket and are aligned with the at least one spring.

7. The bracket according to claim 1, wherein the at least one spring is a leaf spring formed by bending ends of a flexible strip-shaped material upwards.

8. The bracket according to claim 1, further comprising two locking slots provided on a surface of the lid.

9. The bracket according to claim 1, wherein the at least one bearing is formed on a base of the lid and is aligned with the at least one spring on the lid.

10. The bracket according to claim 1, further comprising a safety mechanism, wherein the safety mechanism prevents the lid from being detached from the body while shifting from a closed position to an open position by means of the at least one spring, the safety mechanism forms side arms in the spring and lock group, being positioned between a step on a guide and the at least one bearing protruding downward.

11. The bracket according to claim 1, wherein the at least one spring is configured to be fitted with the bearing without getting deformed when the wire exerts pressure onto the at least one spring as the lid moves between a closed position and an open position.

12. The bracket according to claim 1, wherein two locking recesses are provided at the lid to provide a gap or space on the lid, and the two locking recesses enable the spring and lock group to be attached onto the lid.

13. A bracket for orthodontic treatment, comprising
a body;
a slot, wherein the slot extends in a vertical plane from a ceiling of the body towards a base of the body and the slot receives a wire;
a lid, wherein the lid moves forwards/backwards to open or close a mouth of the slot, and the lid comprises two bearings protruding downward toward the slot;
a spring and lock group having two bearings, wherein the spring and lock group is provided between the body and the lid, the spring and lock group extends in the vertical plane and moves together with the lid, and the spring and lock group has a first end being fixed to the lid and a second end being free;
a movement mechanism, wherein the movement mechanism has two parallel rails extending on the ceiling of the body perpendicularly to the slot and at least two slides into the rails and vertically extending downwards from a lower surface of the lid, and the movement mechanism enables the lid to move by sliding on the ceiling of the body;
two recesses provided in between the two springs and the lid, wherein the two recesses enable the two springs and the two bearings to be flush with each other when the two springs are pushed upward;
a flat platform, wherein the flat platform is positioned between the two parallel rails on the body, and
two guides, wherein the two guides are positioned beside the two parallel rails on the bracket and are aligned with the two springs; and two housings, wherein the two housings are provided on the two guides close to a labial side and the two springs are fitted in the two housings.

14. The bracket according to claim 13, further comprising a protrusion on each guide at a side of each of the two housings facing the slot.

15. The bracket according to claim 13, wherein the at least two springs, the two housings and the two recesses are compatible to each other.

16. A bracket for orthodontic treatment, comprising
a body;
a slot, wherein the slot extends in a vertical plane from a ceiling of the body towards a base of the body and the slot receives a wire;
a lid, wherein the lid moves forwards/backwards to open or close a mouth of the slot, and the lid comprises at least one bearing protruding downward toward the slot;
a spring and lock group having at least one spring, wherein the spring and lock group is provided between the body and the lid, the spring and lock group extends in the vertical plane and moves together with the lid, and the spring and lock group has a first end being fixed to the lid and a second end being free;
a movement mechanism, wherein the movement mechanism has two parallel rails extending on the ceiling of the body perpendicularly to the slot and two slides fitted into the rails and vertically extending downwards from a lower surface of the lid, and the movement mechanism enables the lid to move by sliding on the ceiling of the body;
at least one recess provided in between the at least one spring and the lid, wherein the at least one recess enables the at least one spring and the at least one bearing to be flush with each other when the at least one spring is pushed upward;
a flat platform, wherein the flat platform is positioned between the two parallel rails on the body, and
two guides, wherein the two guides are positioned beside the two parallel rails on the bracket and are aligned with the at least one spring; and
a step on each of the two guides, wherein the step comprises an inclined surface provided at a side of each of the two guides facing the two parallel rails, and a flat surface extending from an end point of the inclined surface.

* * * * *